Patented Oct. 13, 1931

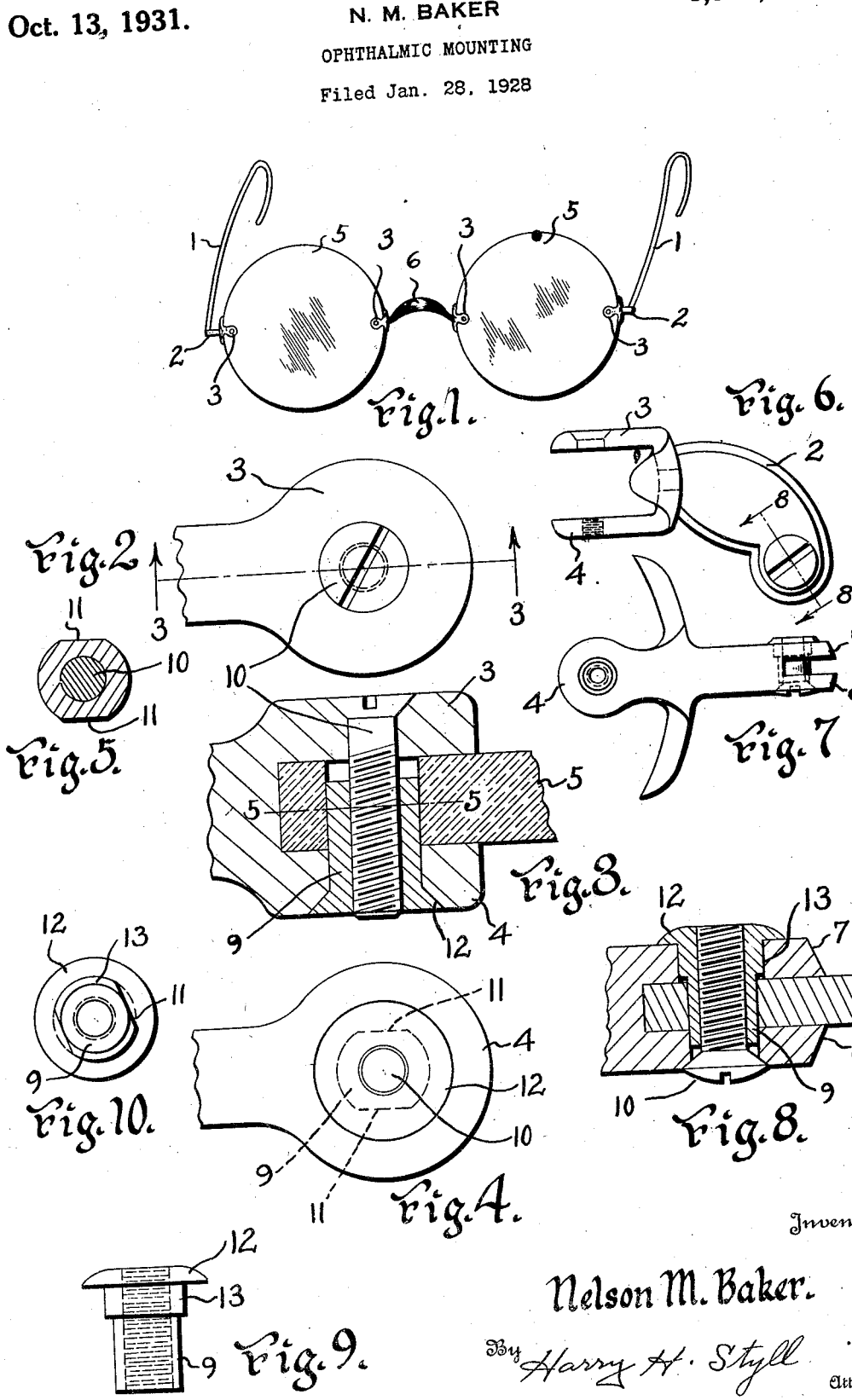

1,827,345

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed January 28, 1928. Serial No. 250,217.

This invention relates to improvements in clamping means and has particular reference to means for clamping together the parts of an ophthalmic mounting.

The principal object of the invention is to provide increased thread bearing for the clamping members.

Another object of the invention is to provide a pivot support or bearing for the clamped member which will avoid the backing out or loosening of the clamping means.

Another object of the invention is to provide means for securing the pivot support against rotation as the clamped member is moved.

Another object is to provide such a device that will be economical, efficient and effective.

Other objects and advantages of the invention will be apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been shown by way of illustration.

Referring to the drawings:

Fig. 1 is a front elevation of an ophthalmic mounting embodying the invention;

Fig. 2 is a fragmentary enlarged plan view of a clamping member;

Fig. 3 is a sectional view on line 3—3 of Fig. 2;

Fig. 4 is a bottom plan view of Fig. 3;

Fig. 5 is a fragmentary sectional view on line 5—5 of Fig. 3 taken through the screw connection;

Fig. 6 is a top or plan view of an endpiece member;

Fig. 7 is a front elevation of the endpiece member shown in Fig. 6;

Fig. 8 is an enlarged sectional view on line 8—8 of Fig. 6 showing a modified form of the invention;

Fig. 9 is an elevation of the tubular member shown in Fig. 8;

Fig. 10 is a bottom plan view of Fig. 9.

Prior to the present invention clamp screws were threaded directly into one of the straps formed on the lens clamp or endpiece members. These clamp or endpiece members were made very small to be as inconspicuous as possible when on the face of the wearer and were, therefore, impractical for forming a threaded connection, such as previously stated, as the lens straps were so thin that only a few threads could be formed therein and would often strip or break when the screws were tightened.

The screw in the endpiece member also served as a pivot for the temple and was very impractical due to the ratchet action of the temple upon the screw which caused it to back out and become loose.

This action also took place in the lens clamp members due to the movement of the lenses during the cleaning thereof, or the like, and likewise caused the screws in the lens clamps to eventually back out and become loose.

The present invention overcomes these difficulties by providing an increased thread bearing for the clamp or endpiece screws so that the screws may be tightened without stripping or breaking the threads and also provides a pivot bearing for the temple which will not cause the screw to back out and become loose as in the prior art constructions.

Referring more particularly to the drawings, the temples 1 are positioned in the endpiece members 2 which are provided with the spaced lens strap or clamp members 3 and 4 used in securing the endpieces to the lenses 5.

The lenses 5 are connected centrally by the bridge member 6 which is also provided adjacent its ends with the spaced lens strap or clamp members 3 and 4 by which the bridge is secured to the lenses. The endpiece members 2 are also provided with a second pair of spaced ears 7 and 8 which are adapted to pivotally support the temple 1. The lens clamps or straps 3 and 4 are formed with aligned openings, one of which is adapted to receive the tubular member 9 which is formed with a threaded bore, and the other, the screw member 10, which is adapted to be positioned in the threaded bore of the tubular member 9. The tubular member 9 is provided with the flattened outer faces 11 adapted to engage a corresponding flattened portion of the opening in which it is inserted and is thereby held against rotation when the screw 10 is tightened. The tubular member 9 is also provided with the flanged portion 12 adapted to fit within the countersunk portion of the opening in the lens strap 4 and thereby draws the lens clamps or straps together when the screw 10 is tightened.

Figs. 6, 7, 8, 9 and 10 show a slight modification in which the tubular member 9 is provided with a shoulder 13 having the flattened portions 11. In this instance the flattened portion does not extend the entire length of the tube as shown in the previous construction and it will be noted that the tube 9 is also used as a pivot for the temple 1. By reference to Figs. 8 and 10 it will be seen that the temple 1 may be moved about the tubular member 9 without causing any frictional or ratchet action on the screw 10, as previously stated in the prior art constructions, as the tubular member while serving as a pivot for the temple 1 is locked against rotation in the ear 7 by the flattened portion 11. The tubular member also provides a longer thread bearing for the screw 10 so that it may be tightened without stripping or breaking the threads. The tubular member 9 is also provided with a flanged portion 12 as in the previous construction.

The construction shown in Figs. 2, 3 and 4 accomplishes the same results as that shown in the modified form, the only difference being in the mechanical construction. It will be seen that it is optional as to whether the tubular member 9 extends partially through the lens as shown in Fig. 3, or entirely through the lens and partially into the opening in the opposite clamp or strap member as shown in Fig. 8.

From the foregoing description it will be seen that I have provided simple, durable, inexpensive and effective means for accomplishing the objects of the invention.

Having described my invention, I claim:

1. Means for uniting the parts of an ophthalmic mounting comprising a pair of spaced members having aligned openings therein, one of said openings having a contour shape which departs from a full circle, a secured member extending between the spaced members and having an opening therein aligned with the openings in said spaced members, a tubular member in the aligned openings, said tube having an enlarged portion engaging with one of the spaced members, a relatively long portion extending into the opening in the secured member, and an intermediate shouldered portion of substantially the same contour shape as the opening having its contour shape departing from a full circle and extending therein substantially the full length of said opening and means extending through the opening in the spaced member opposite the spaced member engaged by the enlarged portion of the tube adapted to engage with the tubular member to draw the two spaced members together.

2. Means for connecting the parts of an ophthalmic mounting comprising a pair of spaced members having aligned openings therein and interlocking means adjacent one of said openings, a secured member extending between the spaced members and having an opening aligned with the openings in said spaced members, a tubular member in the aligned openings, said tube having an enlarged portion engaging with one of said spaced members, a reduced portion extending into the secured member and having intermediate interlocking means between the enlarged portion and reduced portion adapted to engage with the interlocking means adjacent the opening in the spaced member and extending substantially the full length of said opening and a screw member extending through the opening in the spaced member opposite the spaced member engaged by the enlarged portion of the tube adapted to engage with the tubular member to draw the two spaced members together.

NELSON M. BAKER.